United States Patent
Kelly et al.

(10) Patent No.: US 6,766,652 B2
(45) Date of Patent: Jul. 27, 2004

(54) DUAL INDEPENDENT CHAMBER ULTRA-LOW TEMPERATURE FREEZER

(75) Inventors: Allan Kelly, Hendersonville, NC (US); Chuan Weng, Weaverville, NC (US)

(73) Assignee: GSLE Development Corporation, Charlotte, NC (US)

( * ) Notice: Subject to any disclaimer, the term of this patent is extended or adjusted under 35 U.S.C. 154(b) by 0 days.

(21) Appl. No.: 10/321,584

(22) Filed: Dec. 18, 2002

(65) Prior Publication Data

US 2004/0118139 A1 Jun. 24, 2004

(51) Int. Cl.[7] .............................. F25B 5/00; F25B 7/00

(52) U.S. Cl. ........................................ 62/199; 62/335

(58) Field of Search ........................ 62/175, 335, 199, 62/200, 441, 442, 117, 201, 470

(56) References Cited

U.S. PATENT DOCUMENTS

| | | | | |
|---|---|---|---|---|
| 5,335,508 A | * | 8/1994 | Tippmann | 62/129 |
| 5,600,966 A | * | 2/1997 | Valence et al. | 62/440 |
| 5,737,939 A | * | 4/1998 | Valence et al. | 62/441 |
| 6,131,401 A | * | 10/2000 | Ueno et al. | 62/175 |
| 6,405,554 B1 | * | 6/2002 | Kawakatu et al. | 62/335 |
| 6,557,358 B2 | * | 5/2003 | Weng et al. | 62/114 |
| 2002/0134096 A1 | * | 9/2002 | Shim et al. | 62/228.1 |

* cited by examiner

Primary Examiner—Marc Norman
(74) Attorney, Agent, or Firm—Baker & Hostetler LLP

(57) ABSTRACT

Methods and apparatus for a two chamber freezer whereby both chambers can be maintained at a substantially constant ultra-low temperature, such as within the range of about −40° C. to −80° C. Short term items may be stored in and accessed by the upper door from an upper chamber while long term items may be stored in and accessed by the lower door in the lower chamber. The upper and lower chambers are thermodynamically independent of each other thereby reducing the power usage of the freezer.

19 Claims, 5 Drawing Sheets

DUAL INDEPENDENT CHAMBER ULTRA-LOW TEMPERATURE FREEZER

FIELD OF INVENTION

The present invention relates generally to an apparatus for low temperature refrigeration systems. More particularly, the present invention relates to a dual independent freezer chamber design of an ultra-low temperature refrigeration system.

BACKGROUND OF THE INVENTION

In refrigeration systems, a refrigerant gas is compressed in a compressor unit. Heat generated by the compression is then removed generally by passing the compressed gas through a water or air cooled condenser coil. The cooled, condensed gas is then allowed to rapidly expand into an evaporating coil where the gas becomes much colder, thus cooling the coil and the inside of the refrigeration system box around which the coil is placed.

Life Science researchers have a need for short-term, high access and long-term, low access storage chambers. These researchers also need to minimize any product warm-up when a freezer door is opened for any appreciable time. Two short vertical doors would allow less air infiltrations and consequently less product warm-up than the conventional single tall vertical door when opened.

A problem which has arisen with such ultra low temperature freezers is that when the front door is opened, the extremely cold and heavy air within the chamber tends to spill out of the bottom of the chamber through the front opening of the freezer. Often, these freezers are used for both "long term" and "short term" items which must both be maintained at the same low temperature. Often, short term items must be accessed in a repeated fashion throughout the day and therefore the extremely cold and relatively heavy air, when compared to ambient air, sinks to the bottom of the freezer and spills or falls out the bottom of the front door opening resulting in a substantial loss of cold air every time the door is opened. This not only undesirably increases the temperature of the freezer chamber and its contents, but places increased loads on the refrigeration unit as it must operate on a more continuous basis to account for all of the lost cold air from within the chamber.

It would therefore be desirable to provide an ultra low temperature freezer which allowed ready access to both long term and short term items maintained therein at the same or differing temperatures in respective independently operated and controlled chambers when items are repeatedly accessed.

The present invention also provides many additional advantages which shall become apparent as described below.

SUMMARY OF THE INVENTION

The present invention uses independently controllable chambers (i.e., −40° C. to −80° C.) to provide additional storage flexibility to users.

It is therefore a feature of the present invention to provide a freezer including a cabinet, a first freezer chamber having insulated peripheral walls including a pair of side walls, a rear wall, a top wall and a bottom wall disposed in a top portion of said cabinet, a second freezer chamber having insulated peripheral walls including a pair of side walls, a rear wall, a top wall and a bottom wall disposed in a bottom portion of said cabinet, an upper insulated door hingedly secured to one of the side walls of the first freezer chamber, a lower insulated door hingedly secured to one of the side walls of the second freezer chamber, and a refrigeration unit connected to the freezer which cools the first and second freezer chambers to a substantially uniform temperature between about −40° C. and 80° C., in which the first and second freezer chambers are independently controllable.

It is another feature of the present invention to provide a freezer including a first circuit having a first evaporator and a first expansion device, a second circuit having an second evaporator and a second expansion device, a refrigeration compression device, and an oil separator, wherein a high-pressure refrigerant stream splits after passing through the oil separator and a low-pressure refrigerant stream recombines after passing through the first and second evaporators.

It is another feature of the present invention to provide a freezer including a first circuit having a first evaporator and a first capillary expansion device, a second circuit having a second evaporator and a second capillary expansion device, a refrigeration compression device, and an oil separator, wherein a high-pressure refrigerant stream splits after passing through the oil separator and a low-pressure refrigerant stream recombines after passing through the first and second evaporators.

It is another feature of the present invention to provide a method of independently controlling dual freezer chambers, comprising the steps of providing a dual cascade system having a high-stage and a low-stage circuit, wherein the high-stage circuit includes a compressor, a condenser, and an expansion device; splitting a refrigerant stream after oil separation occurs into a first and a second low-stage circuit; controlling the flow of the split refrigerant stream into a cascade heat exchanger with a first and a second solenoid valve, respectively; passing the split refrigerant stream through a first and a second expansion device and a first and a second evaporator, respectively; controlling the migration of the split refrigerant stream with a third and a fourth solenoid valve, respectively; recombining the split refrigerant stream after passing through the first and the second evaporators; and compressing the recombined refrigerant stream with.

It is another feature of the present invention to provide a method of independently controlling dual freezer chambers, comprising the steps of providing a dual cascade system having a high-stage and a low-stage circuit, wherein said high-stage circuit includes a compressor, a condenser, and an expansion device, splitting a refrigerant stream after oil separation occurs into a first and a second low-stage circuit; passing the split refrigerant stream through a first and a second expansion control device and a first and a second evaporator, respectively; recombining the split refrigerant stream after passing through said first and said second evaporators; and compressing the recombined refrigerant stream with a refrigeration compression device.

It is another feature of the present invention to provide a cascade heat exchanger thermodynamically connected to a high-stage circuit, a first low-stage circuit and a second low-stage circuit, wherein the first low-stage circuit is connected to the first freezer chamber and the second low-stage circuit is connected to the second low-stage circuit.

There has been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purposes of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent construction insofar as they do not depart from the spirit and scope of the present invention.

DETAILED DESCRIPTION OF PREFERRED EMBODIMENTS OF THE INVENTION

Figure 1:
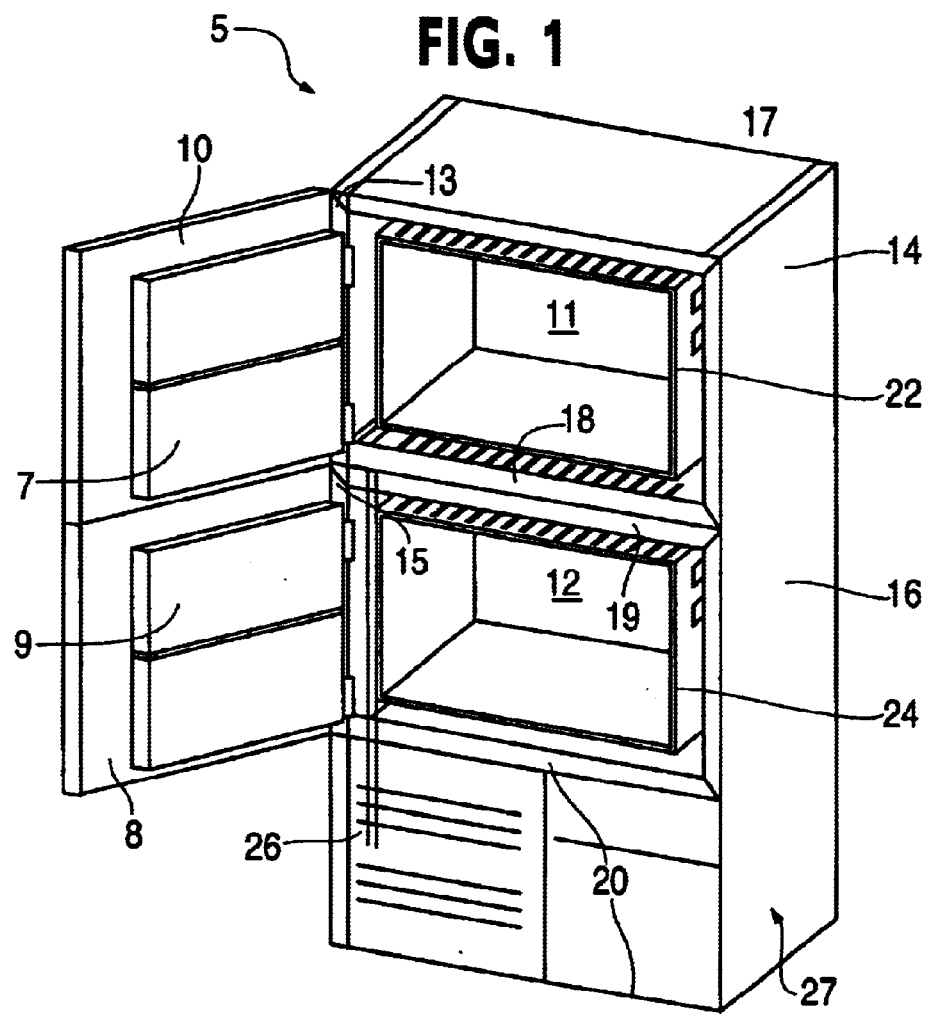
FIG. 1 is a perspective view of the dual chamber shell subassembly according to the present invention.

Referring now to the Figures, in FIG. 1 there is shown a dual chamber shell sub-assembly for an ultra-low temperature refrigeration system. Cabinet 5 is constructed with two independent storage volumes 11, 12 stacked and fastened internally. Each cabinet uses cold-wall evaporators (not shown), two hinged interior doors 7, 9 and two exterior doors 8, 10. The rear wall (not shown) may be a composite of vacuum insulation panels and expanded polyurethane foam. The remaining side walls 13, 14, 15, 16 and top/bottom walls 17, 18, 19, 20 and exterior doors 8, 10 may be homogeneous polyurethane foam. The freezer chamber units 22, 24 install within storage volumes 11, 12. Control lines 26 connect to each freezer unit accordingly. The wall selection permits high storage efficiency while utilizing a proven door seal interface. The use of symmetry reduces the number of parts required to fabricate the cabinet and chambers. The refrigeration system is housed in compartment 27.

Figure 2:
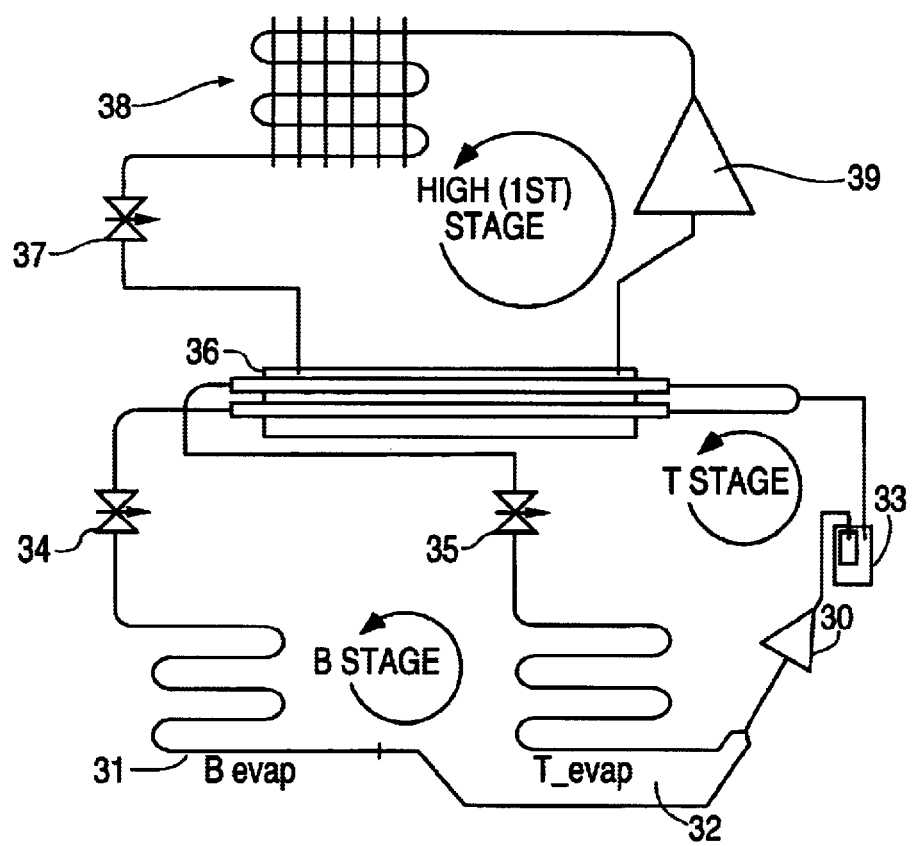
FIG. 2 is a schematic diagram of a dual cascade system with a split low-stage circuit according to the present invention.

The present invention may use refrigerants R404a and R508b in two possible approaches. Referring to FIG. 2, a dual cascade system with a split flow in the low stage circuit comprising a cascade heat exchanger 36, condenser 38, high stage compressor 39, a single low-stage reciprocating compressor 30, a R404a expansion valve 37, R508b expansion valves 34, 35, independent evaporators 31, 32 and an oil separator 33 may be utilized. The single low-stage reciprocating compressor 30 supplies refrigerant to the two independent evaporators 31, 32. A high-pressure gas stream is split after oil separation occurs. The split gas stream passes through the cascade heat exchanger 36. The refrigerant R508b expansion valves or electronically controlled expansion valves 34, 35 will meter the refrigerant responsively to varying evaporator loads. The refrigerant recombines after leaving the evaporators 31, 32 to return to the low-stage reciprocating compressor 30. The separation or split flow allows the two freezer chambers 22, 24 to remain independent while only using a single low-stage reciprocating compressor 30. The configuration of using a single low-stage reciprocating compressor to drive both refrigerant loops is efficient and limits operating current in order to utilize any standard 115V-20A power supply.

Figure 3:
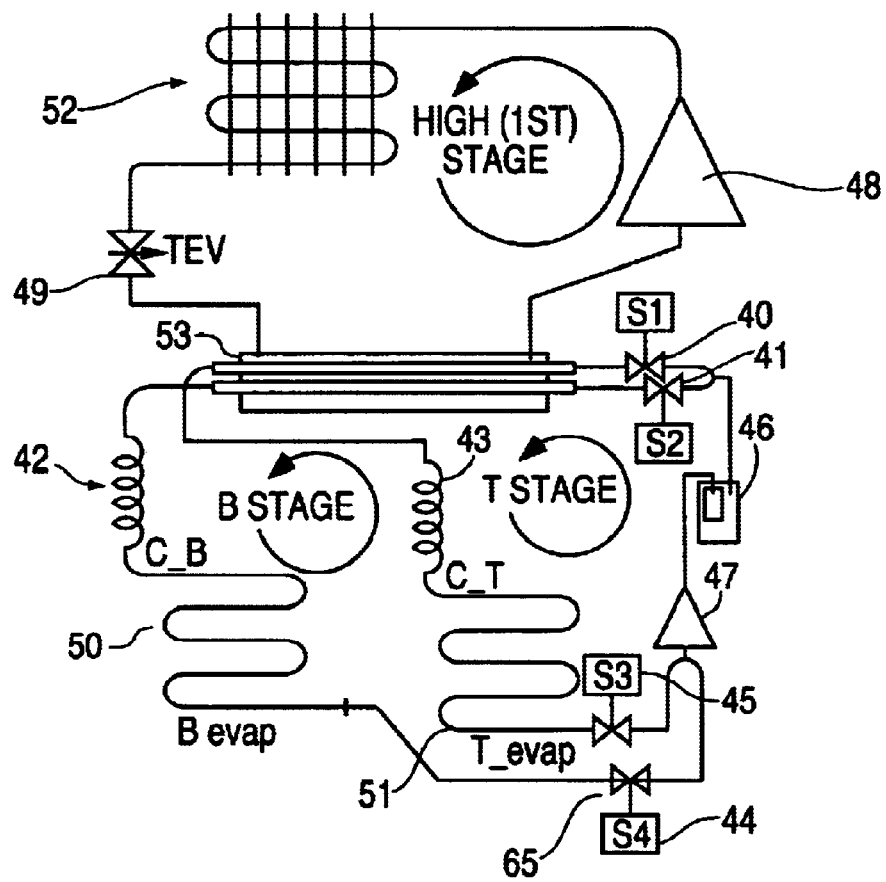
FIG. 3 is a schematic diagram of a dual cascade system with a split low-stage circuit in accordance with another embodiment of the present invention.

Alternately, referring to FIG. 3, a dual cascade system with a split flow in the low stage circuit comprising a cascade heat exchanger 53, condenser 52, high stage reciprocating compressor 48, a single low-stage reciprocating compressor 47, an expansion valve 49, normally open solenoid valves 40, 41, independent evaporators 50, 51, capillary expansion tubes 42, 43, solenoid valves 44, 45 and an oil separator 46 may be utilized.

A high-pressure refrigerant gas stream is split after oil separation occurs. The split gas stream passes through the normally open solenoid valves 40, 41 and into the cascade heat exchanger 53. The normally open solenoid valves 40, 41 open refrigerant flow to capillary expansion tubes 42, 43 feeding either chamber 22, 24 in response to the cooling demand. Solenoid valves, 44, 45 prevent migration of refrigerant to the active chamber during single chamber 22 or 24 operation. The refrigerant recombines after leaving solenoid valves 44, 45 to return to the low-stage reciprocating compressor 47. Split flow is complicated by the less responsive capillary expansion tubes 42, 43. However, capillaries are sometimes preferred to expansion valves since capillaries rarely leak or require adjustment. Again, the single low-stage compressor 47 is economical and limits operating current in order to utilize any standard 115V-20A power supply.

Figure 4:
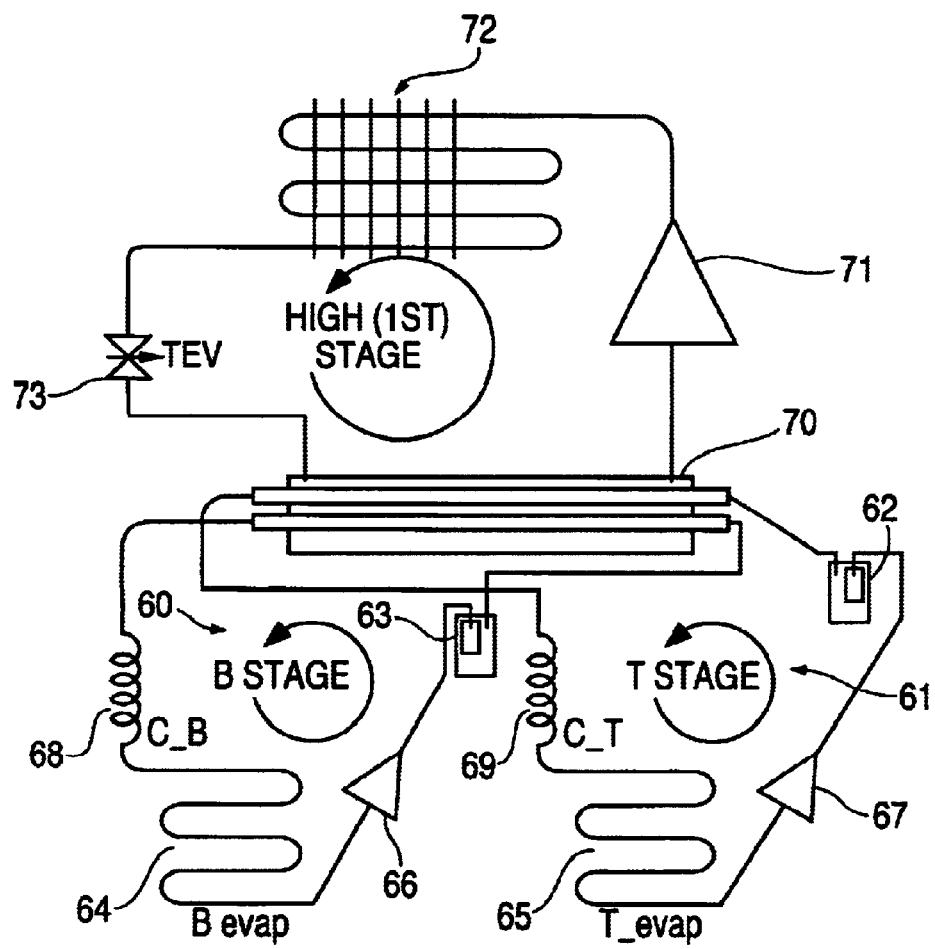
FIG. 4 is a schematic diagram of a dual cascade system with independent low-stage circuits accordance with another embodiment of the present invention.

Referring to FIG. 4, a dual cascade system with two independent low-stage cooling circuits 60, 61 comprising a cascade heat exchanger 70, capillary expansion tubes 68, 69, an expansion valve 73, a high stage reciprocating compressor 71, low stage reciprocating compressors 66, 67, oil separators 62, 63, evaporators 64, 65 and a condenser 72 may be utilized. After oil separation occurs, a high-pressure gas stream passes through a cascade heat exchanger 70. The refrigerant flows to capillary expansion tubes 68, 69 feeding respective chambers 22, 24 in response to the cooling demand of each respective evaporator 64, 65 accordingly. This approach avoids flow splitting complications making the system less sensitive to evaporator load differences. Moreover, the system requires simple "on-off" control rather than more complicated flow control strategies. The trade off is higher operating current but it can be managed with smaller, efficient low-stage compressors.

Figure 5:
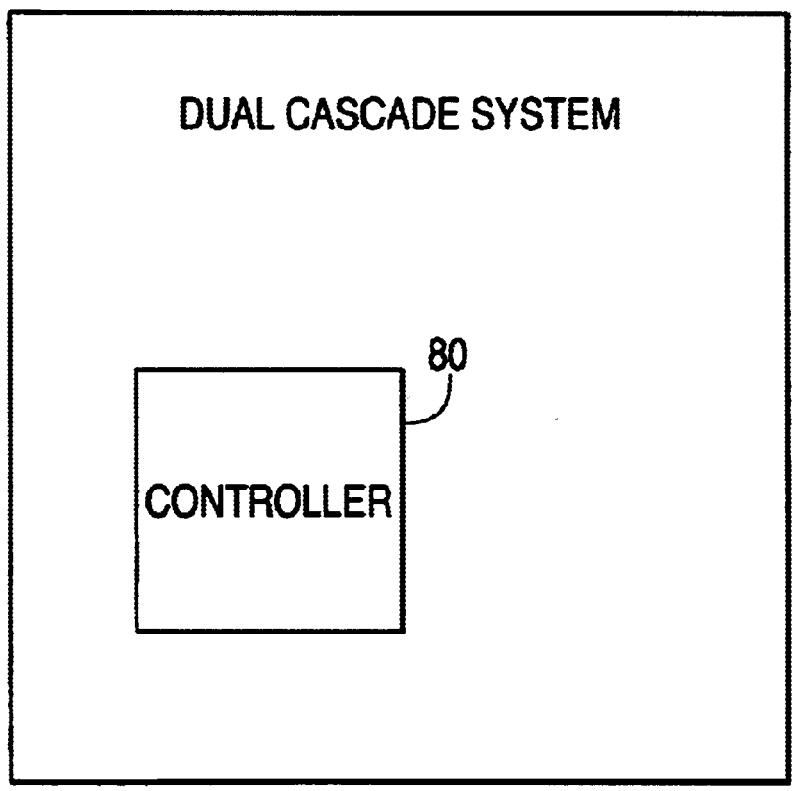
FIG. 5 is a block diagram showing the dual cascade system with a controller.

Referring to FIG. 5, the present invention may use a life sciences temperature controller 80 having alarm features, self-diagnostics and a cascade system control. The temperature controller 80 however will need to meet special requirements, for example, at least three inputs, heat exchange, top and bottom chamber temperature readings, two output signals for compressors and/or solenoids, and about two pulsed output signals for electronic expansion valves (not shown). It will also require logic functions, for example, staging multiple compressor start-up, insuring balanced pressure start-up assisting low current/low torque motors, and superheat evaluation functionality.

The above description and drawings are only illustrative of preferred embodiments which achieve the objects, features, and advantages of the present invention, and it is not intended that the present invention be limited thereto. Any modification of the present invention which comes within the spirit and scope of the following claims is considered to be part of the present invention.

What is claimed is:

1. A freezer comprising:
   a cabinet;
   a first freezer chamber having insulated peripheral walls including a pair of side walls, a rear wall, a top wall and a bottom wall disposed in a top portion of said cabinet;
   a second freezer chamber having insulated peripheral walls including a pair of side walls, a rear wall, a top wall and a bottom wall disposed in a bottom portion of said cabinet;
   an upper insulated door hingedly secured to one of said side walls of said first freezer chamber;
   a lower insulated door hingedly secured to one of said side walls of said second freezer chamber; and
   a refrigeration unit connected to said freezer which cools said first and second freezer chambers to a substantially uniform temperature between about −40° C. and −80° C.,
   wherein said first and said second freezer chambers are independently controllable and said cabinet further comprises outer vertical doors hingedly secured along said top and bottom portions, respectively and;
   wherein refrigerants R404a and R508b are used in a dual cascade system connected to said first freezer chamber and said second freezer chamber.

2. The freezer according to claim 1, wherein said dual cascade system further comprises:
   a cascade heat exchanger thermodynamically connected to a high-stage circuit and a split low-stage circuit having a high-pressure refrigerant stream and a low-pressure refrigerant stream,
   wherein said split low-stage circuit is connected independently to said first freezer chamber and said second freezer chamber.

3. The freezer according to claim 2, wherein said split low-stage circuit comprises:
   a first circuit having a first evaporator and a first expansion device;
   a second circuit having an second evaporator and a second expansion device;
   a refrigeration compression device; and
   an oil separator,
   wherein said high-pressure refrigerant stream splits after passing through said oil separator and said low-pressure refrigerant stream recombines after passing through said first and second evaporators.

4. The freezer according to claim 3, wherein said first and second expansion devices are electronic expansion devices.

5. The freezer according to claim 2, wherein said split low-stage circuit comprises:
   a first circuit having a first evaporator and a first capillary expansion device;
   a second circuit having a second evaporator and a second capillary expansion device;
   a refrigeration compression device; and
   an oil separator,
   wherein said high-pressure refrigerant stream splits after passing through said oil separator and said low-pressure refrigerant stream recombines after passing through said first evaporator and said second evaporator.

6. The freezer according to claim 5, further comprising:
   a first solenoid valve connected inline after said high-pressure refrigerant stream splits in said first circuit;
   a second solenoid valve connected inline after said high-pressure refrigerant stream splits in said second circuit;
   a third solenoid valve connected inline after said first evaporator; and
   a fourth solenoid valve connected inline after said second evaporator,
   wherein said first and second solenoid valves are normally open and said third and fourth solenoid valves prevent migration of refrigerant during single chamber operation.

7. The freezer according to claim 1, wherein said dual cascade system further comprises:
   a cascade heat exchanger thermodynamically connecting a high-stage circuit and a first and a second low-stage circuit each low-stage circuit having a high-pressure refrigerant stream and a low pressure refrigerant stream.

8. The freezer according to claim 7, wherein said first low-stage circuit and said second low-stage circuit are independently controlled by a temperature controller.

9. The freezer according to claim 1, wherein said dual cascade system further comprises:
   a cascade heat exchanger thermodynamically connected to a high-stage circuit, a first low-stage circuit and a second low-stage circuit,
   wherein said first low-stage circuit is connected to said first freezer chamber and said second low-stage circuit is connected to said second low-stage circuit.

10. The freezer according to claim 9, wherein said first low-stage circuit comprises:
    a first evaporator and a first expansion control device;
    a first refrigeration compression device; and
    a first oil separator.

11. The freezer according to claim 10, wherein said first low-stage circuit comprises:
    a second evaporator and a first expansion control device;
    a second refrigeration compression device; and
    a second oil separator.

12. A method of independently controlling dual freezer chambers, comprising the steps of:
    providing a dual cascade system having a high-stage and a low-stage circuit, wherein said high-stage circuit includes a compressor, a condenser, and an expansion device;
    splitting a refrigerant stream after oil separation occurs into a first and a second low-stage circuit;
    controlling the flow of the split refrigerant stream into a cascade heat exchanger with a first and a second solenoid valve, respectively;
    passing the split refrigerant stream through a first and a second expansion device and a first and a second evaporator, respectively;
    controlling the migration of the split refrigerant stream with a third and a fourth solenoid valve, respectively;
    recombining the split refrigerant stream after passing through said first and said second evaporators; and
    compressing the recombined refrigerant stream with a refrigeration compression device.

13. A method of independently controlling dual freezer chambers, comprising the steps of:
- providing a dual cascade system having a high-stage and a low-stage circuit, wherein said high-stage circuit includes a compressor, a condenser, and an expansion device;
- splitting a refrigerant stream after oil separation occurs into a first and a second low-stage circuit;
- passing the split refrigerant stream through a first and a second expansion control device and a first and a second evaporator, respectively;
- recombining the split refrigerant stream after passing through said first and said second evaporators; and
- compressing the recombined refrigerant stream with a refrigeration compression device.

14. An independently controllable dual chamber freezer system comprising:
- means for splitting a refrigerant stream after oil separation occurs into a first and a second low-stage circuit;
- means for controlling the flow of the split refrigerant stream into a cascade heat exchanger;
- means for passing the split refrigerant stream through a first and a second expansion control device and a first and a second evaporator, respectively;
- means for controlling the migration of the split refrigerant stream; means for recombining the split refrigerant stream after passing through said first and said second evaporators; and
- means for compressing the recombined refrigerant stream.

15. The system of claim 14, wherein said means for splitting is an inline refrigerant flow Y-connector.

16. The system of claim 14, wherein said means for controlling the flow of the split refrigerant stream is a first and a second solenoid valve, respectively.

17. The system of claim 14, wherein said means for controlling migration of the split refrigerant stream is a third and a fourth solenoid valve.

18. The system of claim 14, wherein said means for recombining the split refrigerant stream is an inline refrigerant flow Y-connector.

19. The system of claim 14, wherein said means for compressing is a refrigeration compression device.

* * * * *